Nov. 3, 1959   E. F. MILLER   2,910,840
MOTOR-DRIVEN VEHICLES WITH REFRIGERATING APPARATUS
Filed Aug. 11, 1954   8 Sheets-Sheet 1
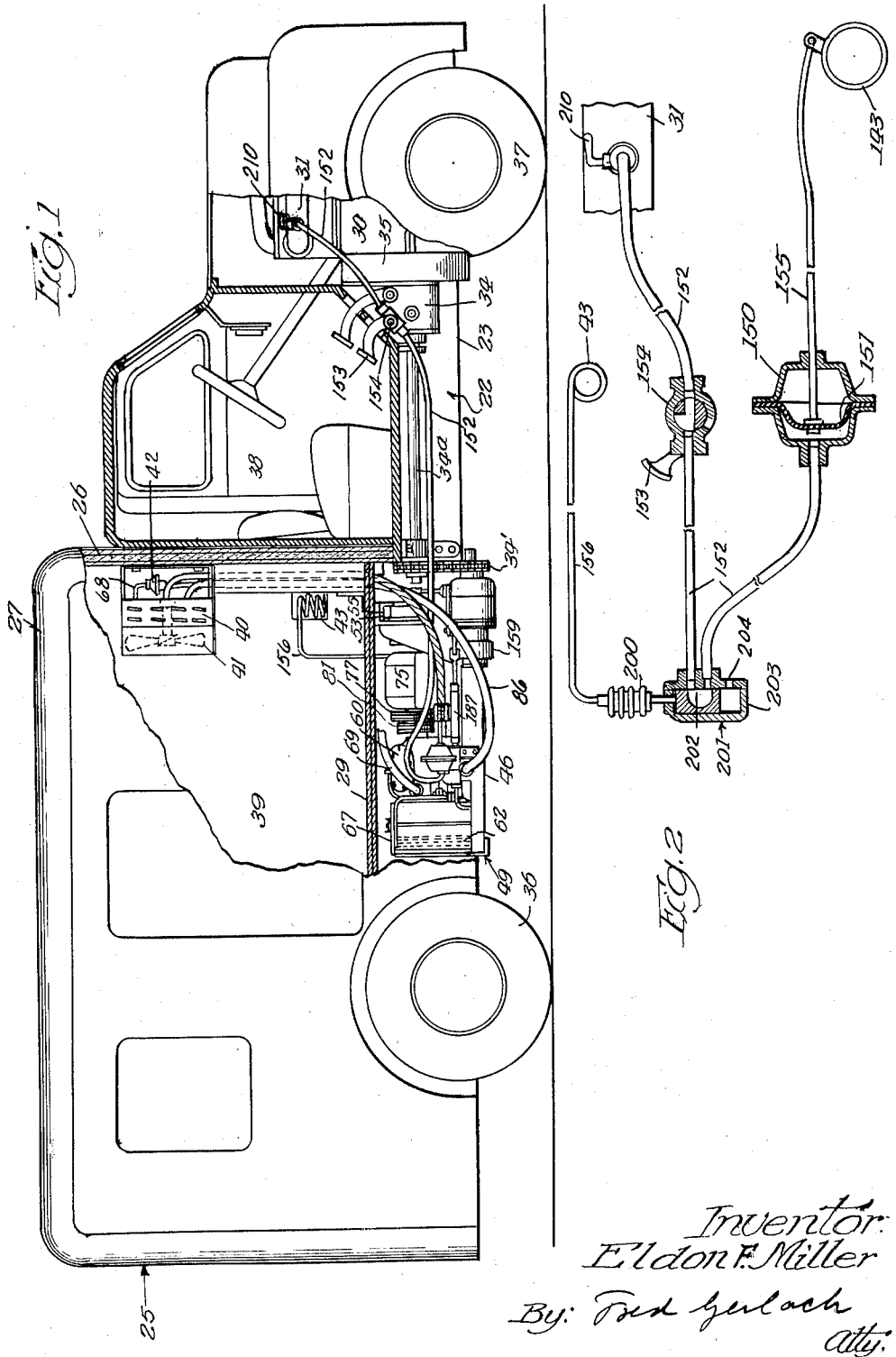
Inventor:
Eldon F. Miller
By: Fred Gerlach
Atty.

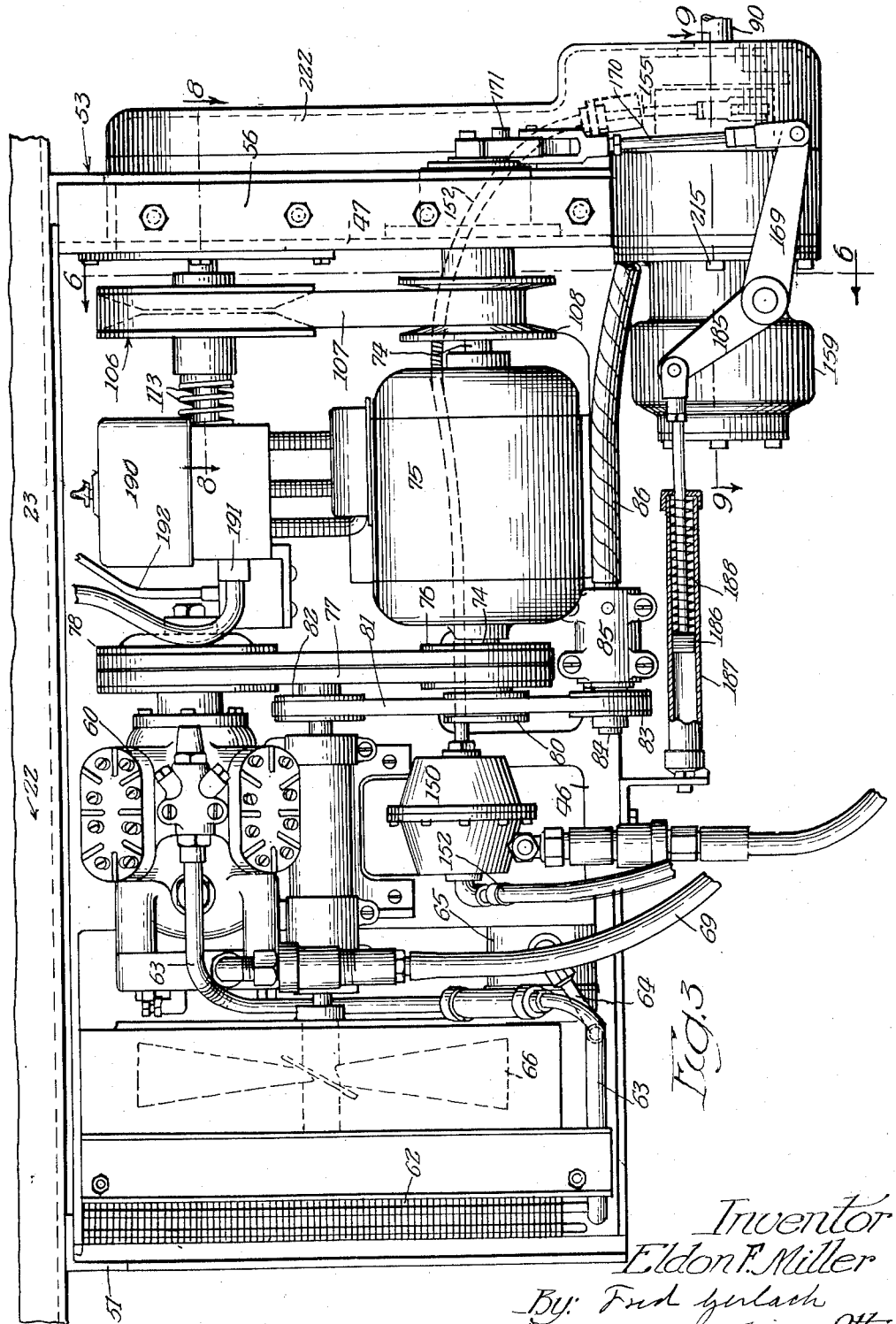

Nov. 3, 1959    E. F. MILLER    2,910,840
MOTOR-DRIVEN VEHICLES WITH REFRIGERATING APPARATUS
Filed Aug. 11, 1954    8 Sheets-Sheet 3
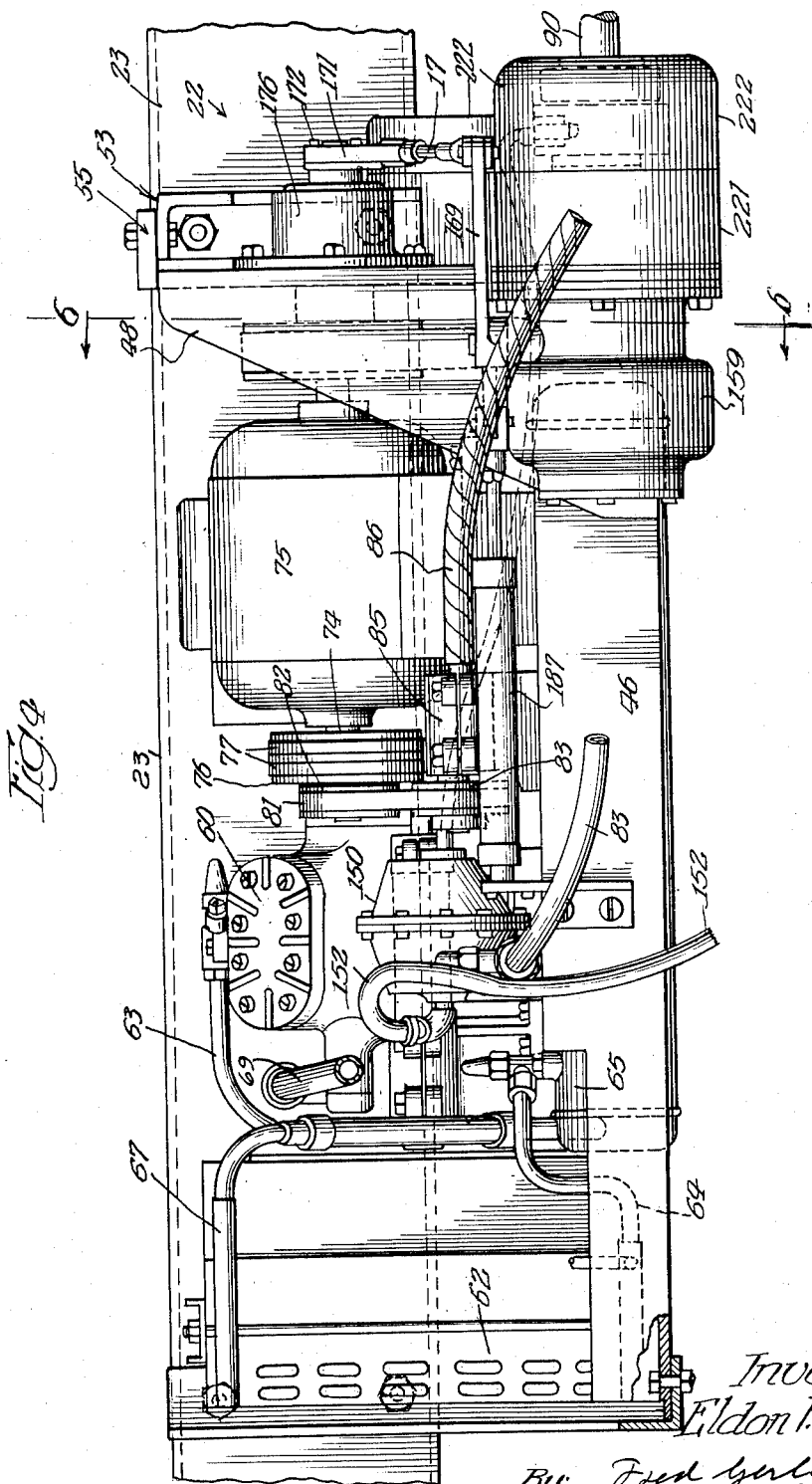
Inventor
Eldon F. Miller
By: Fred Gerlach
his Atty.

Nov. 3, 1959        E. F. MILLER        2,910,840

MOTOR-DRIVEN VEHICLES WITH REFRIGERATING APPARATUS

Filed Aug. 11, 1954        8 Sheets-Sheet 4

Inventor
Eldon F. Miller
By: Fred Gerlach
his Atty.

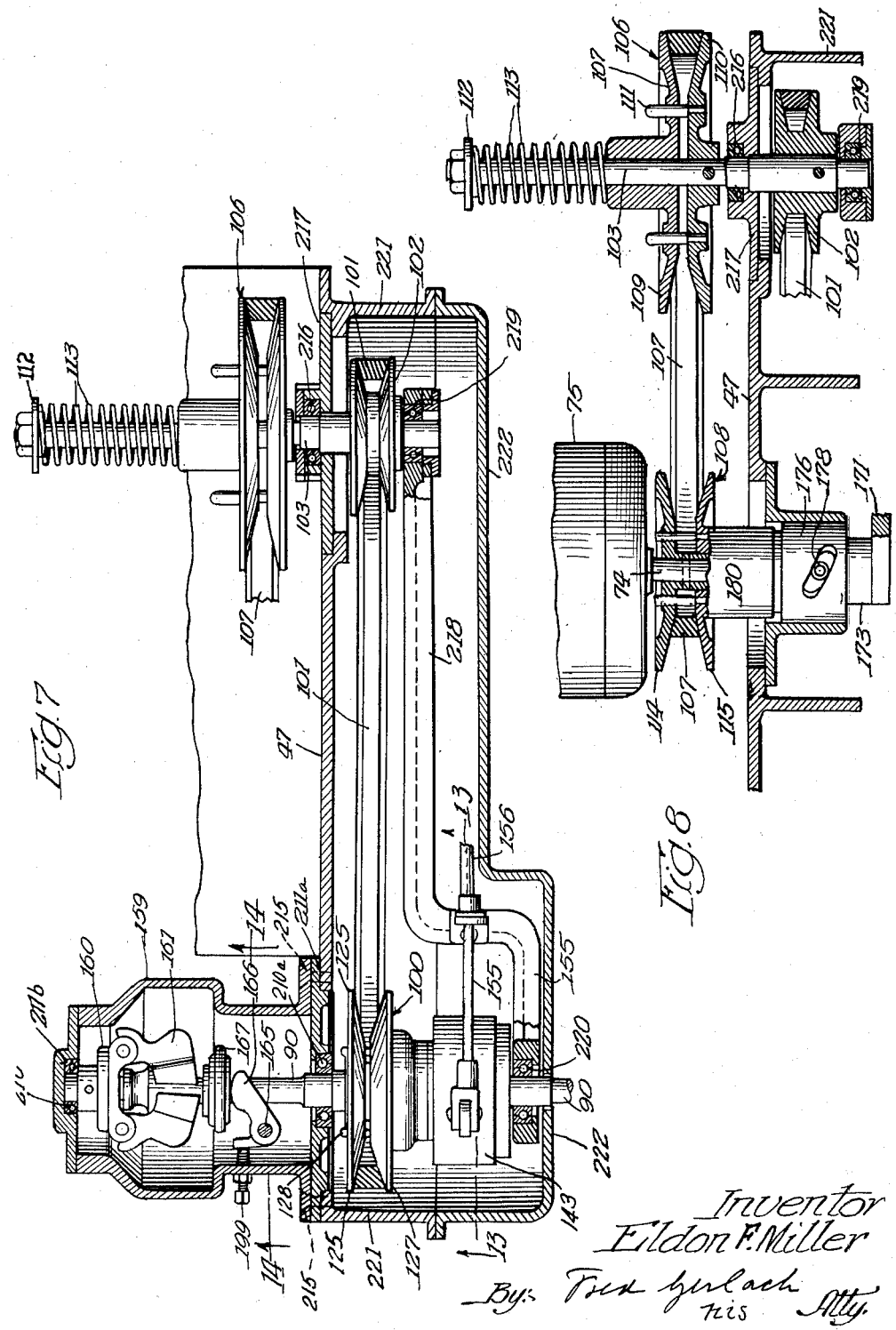

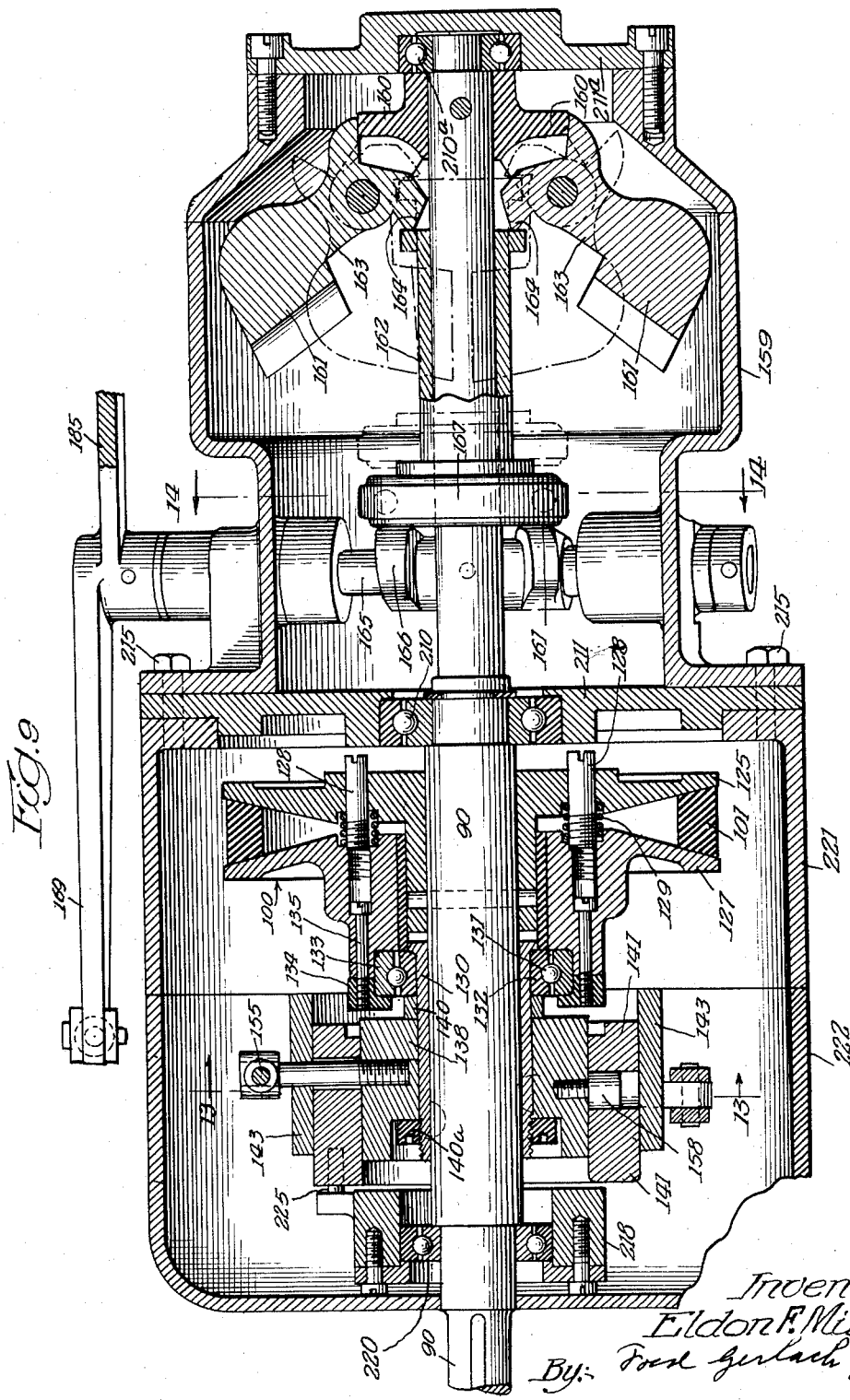

Nov. 3, 1959 E. F. MILLER 2,910,840
MOTOR-DRIVEN VEHICLES WITH REFRIGERATING APPARATUS
Filed Aug. 11, 1954 8 Sheets-Sheet 7
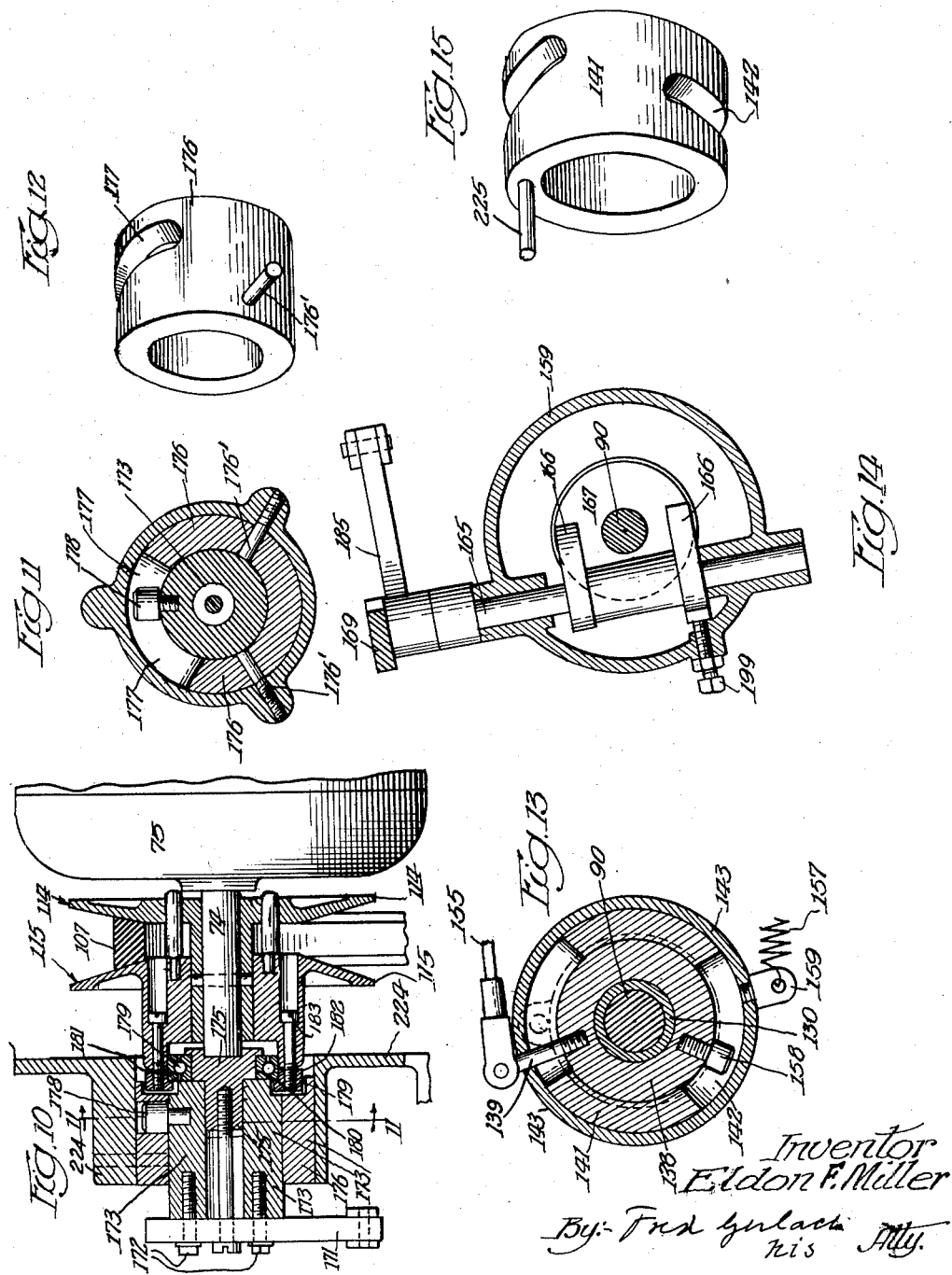
Inventor
Eldon F. Miller
By: Fred Gerlach
his Atty.

Nov. 3, 1959  E. F. MILLER  2,910,840
MOTOR-DRIVEN VEHICLES WITH REFRIGERATING APPARATUS
Filed Aug. 11, 1954  8 Sheets-Sheet 8
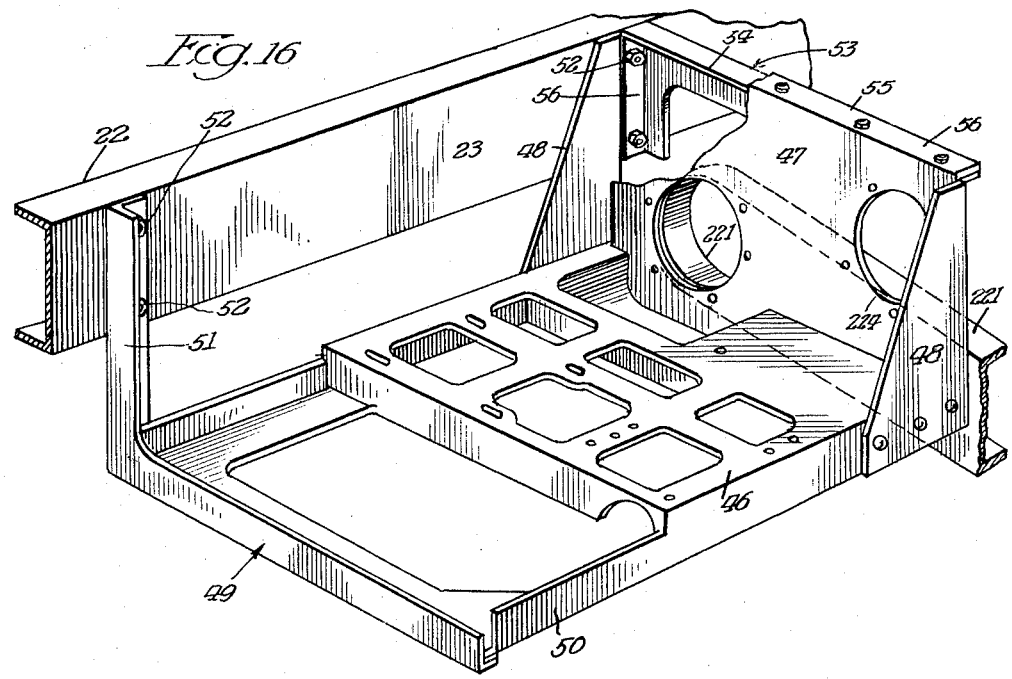
Inventor
Eldon F. Miller
By Fred Gerlach
  Atty.

United States Patent Office 2,910,840
Patented Nov. 3, 1959

2,910,840

MOTOR-DRIVEN VEHICLES WITH REFRIGERATING APPARATUS

Eldon F. Miller, Dunham Woods, Ill., assignor, by mesne assignments, to Effie E. White, Aurora, Ill.

Application August 11, 1954, Serial No. 449,120

8 Claims. (Cl. 62—209)

The invention relates to automotive vehicles which are provided with refrigeration for the load therein being transported or stored.

The objects of the invention are: to provide mechanism for selectively operating the refrigerating apparatus from the driving mechanism for the vehicle; operating mechanism for the refrigerating apparatus, which is readily demountable from the vehicle, for replacement or repair; mechanism for selectively operating the refrigerating apparatus from the driving mechanism for the vehicle or from an electrical outlet of a stationary supply of potential, when the vehicle is idle in a garage; and mechanism for operating the refrigerating apparatus, when driven by power derived from the engine which furnishes the power for propelling the vehicle and is operated at widely fluctuating speeds during the travel of the vehicle, at a substantially uniform and suitable speed for the operation of said apparatus.

The invention consists in the several novel features hereinafter described and more particularly defined by claims at the conclusion hereof.

In the drawings:

Fig. 1 is a side elevation, parts being shown in section, of a vehicle equipped with the invention;

Fig. 2 is a diagrammatic view, partly in section and partly in elevation, of the suction-device for controlling the belt drive which functions as a clutch when said apparatus is operated by power from the engine which propels the vehicle and the control means for said device;

Fig. 3 is a plan view of the refrigerator apparatus located under the floor of the vehicle and the driving mechanisms therefor;

Fig. 4 is a side elevation of the apparatus and mechanisms shown in Fig. 3;

Fig. 7 is a section taken on line 7—7 of Fig. 5;

Fig. 8 is a section taken on line 8—8 of Fig. 5;

Fig. 9 is a section taken on line 9—9 of Fig. 3;

Fig. 10 is a section taken on line 10—10 of Fig. 8;

Fig. 11 is a section taken on line 11—11 of Fig. 10;

Fig. 12 is a perspective view of the cam-ring of the device for adjusting the variable speed belt drive for the refrigerating apparatus;

Fig. 13 is a section taken on line 13—13 of Fig. 7;

Fig. 14 is a section taken on line 14—14 of Fig. 7;

Fig. 15 is a perspective view of the cam-ring of the means for adjusting the belt drive which functions as a clutch; and Fig. 16 is a perspective of the demountable supporting structure for refrigerating apparatus under the floor of the vehicle.

Figure 5:
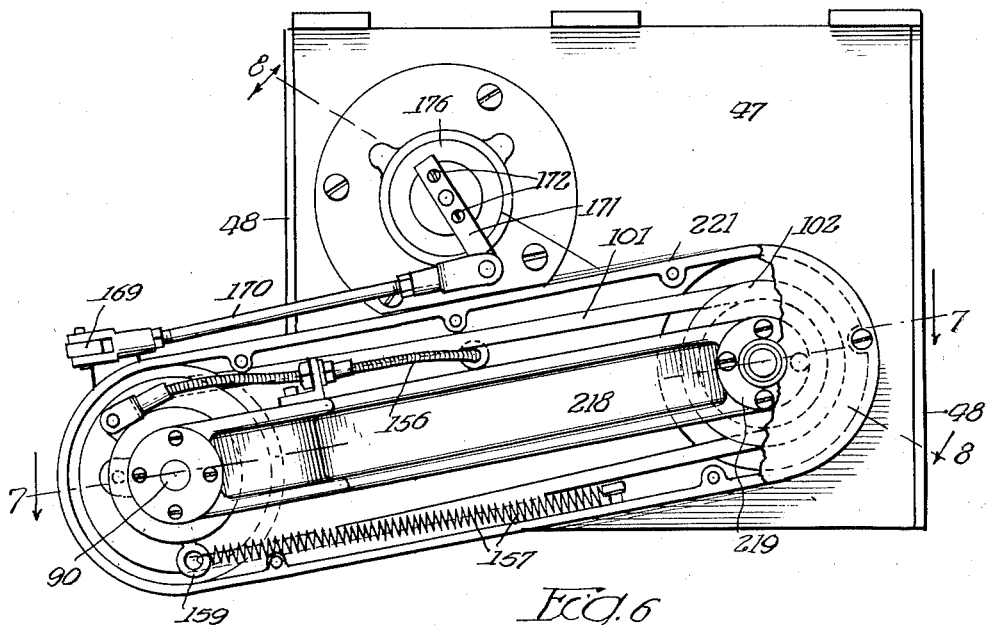
Fig. 5 is a front end elevation of the belt drive which functions as a clutch and is driven from the variable speed transmission for driving the vehicle.
Figure 6:
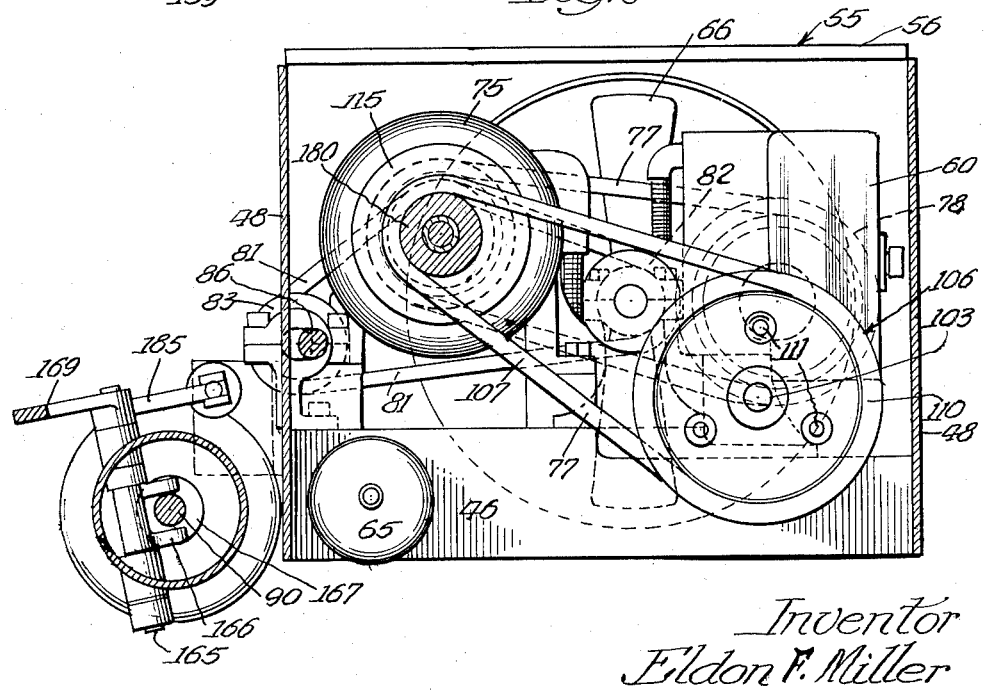
Fig. 6 is a section taken on line 6—6 of Fig. 4.

The invention as exemplified is applied to a motor-driven vehicle with a body providing a compartment for goods in transit; refrigerating apparatus for the goods in said compartment, including an evaporator unit in said compartment and a compressor and condenser for the refrigerant demountably supported under the floor of the vehicle body; gearing driven by power derived from the engine for propelling the vehicle for driving the refrigerating apparatus while the vehicle is travelling or said engine is running; a belt-drive functioning as a clutch for controlling the operation of said gearing; a variable speed drive for driving said apparatus at a suitable speed for refrigeration; automatic means for controlling the variable speed drive to compensate for substantial fluctuations in the power derived from the engine; an electric motor for driving the gearing for operating the refrigerating apparatus independently of said engine; and means for selectively controlling the operation of the electric motor.

The vehicle or truck comprises (Fig. 1): a chassis or frame 22 including longitudinal beams 23; an internal combustion engine 30 with an intake manifold 31 for fuel; a clutch 35 driven by the engine; a variable speed transmission 34 for propelling the vehicle; traction wheels 36, driven from said transmission; front wheels 37; and a vehicle body 25 including a driver's cab 38 equipped with the usual control devices for the operation of the vehicle, and a compartment 39 for transporting goods in back of the cab. The body also includes a floor 29, a roof 27, a front wall or bulkhead 26 and side walls of insulating material to adapt compartment 39 for refrigerating goods in transit. The body 25 contains an evaporator unit including a heat exchanger 40 and an impeller 41 for circulating air in compartment 39; an expansion valve 42 for the refrigerant passing to the evaporator; and means including a thermostat 43 for thermostatically controlling the refrigerating apparatus. This equipment in the body 25 is mounted on the inner side of bulkhead 26 near the roof 27.

The elements of the refrigerating apparatus (Figs. 1, 3 and 4) which are disposed under the vehicle body, comprise: a compressor 60; a condenser 62 which is connected by a pipe 63 to receive refrigerant from compressor 60; a receiver 65 connected by a pipe 64 to receive refrigerant from a condenser 62; a fan 66 for the condenser; a pipe 68 which includes expansion valve 42 for refrigerant from receiver 65 to the evaporator; and a pipe 69 for conducting spent refrigerant from the evaporator to the compressor.

A shaft 74 (Figs. 3 and 8) is selectively operable by power derived from the engine 30 via clutch 35 and variable speed transmission gearing 34 and by electric power derived from motor 75. The shaft 74 is adapted to drive a train of mechanism for driving the refrigerating apparatus. Said mechanism comprises: a belt pulley 76 on shaft 74; a belt pulley 78 on the crank-shaft of compressor 60 and belts 77 around said pulleys for driving the compressor; a belt pulley 80 on shaft 74, a pulley 82 on the shaft of fan 66, and a belt 81 around said pulleys for driving the fan 66; and a pulley 83, which is also driven by belt 81 for driving a shaft 84 which is journalled in a bearing 85 and drives a flexible shaft 86, which is connected to drive the impeller 41 of the evaporator unit in the compartment 39.

The train of mechanism for driving shaft 74 by power from the transmission gearing 34 includes a shaft 90 which is driven by a shaft 34a (Fig. 1) which is driven by transmission 34 and a chain and sprocket drive 34' between shafts 34a and 90. The train of mechanism between the shaft 90 and the shaft 74 comprises a V-belt and pulley drive which functions as a clutch and a variable speed belt drive for compensating for speed fluctuations of shaft 90. The belt and pulley drive which functions as a clutch (Figs. 7 and 9) comprises: a belt-pulley 100, which includes a conical section 125 which is keyed to shaft 90 and a mating section 127 which is slidably mounted on the hub of section 125 and has pins 128 which connect said sections for conjoint rotation and sliding movement of section 127 toward and from section 125; a V-belt 101 adapted to be gripped or released by sections 125 and 127; springs 129 for urging said sections apart; a belt pulley 102 which is fixed to a countershaft 103 and driven by belt 101 when it is gripped by pulley 100 and remains idle when said belt is loose between the sections of pulley 101. The adjustment of pulley section 127 controls the driving of pulley 102 and countershaft 103 to serve as a clutch. When the pulley section 127 is moved away from section 125, belt 101 will be released and idle, and when section 127 is moved toward section 125, the belts 101 will be gripped and drive pulley 102 and countershaft 103.

The means for adjusting the pulley section 127 to grip and release belt 101 for controlling the operation of pulley 102 and countershaft 103, comprises: a suction responsive device (Fig. 2) which includes a casing 150 and a diaphragm 151 therein; a pipe 152 for applying suction from manifold 31 of engine 30 to one side of casing 150 for operating diaphragm 151; a valve 154 in the pipe 152 and operable by a pedal in the driver's cab to control suction from manifold 31 to casing 150; a thermostatically controlled valve 201 included in pipe 152 as hereinafter more fully described; a flexible guided rod 155 operatively connected to diaphragm 151; a ring 143 to which rod 155 is connected and which is rotatable around a non-rotatable sleeve 141 (Figs. 9, 13 and 15) which is provided with a helical cam-slot 142; a collar 138 inside of sleeve 141, rotatable with ring 143; a sleeve 130 axially slidable on shaft 90 and provided with collars 140a and 140 which engage the collar 138 for axial movement with sleeve 130; a ball bearing 131 which includes an inner race 132 movable axially with sleeve 130 and an outer race 133 which is secured by a collar 134 and screws 135, for axial movement with the hub of pulley section 127; and a radial stud 158 mounted on collar 138, engaging the cam-slot 142 in sleeve 141 for axially shifting collar 138, sleeve 130, bearing 131 and the pulley section 127 to and from the pulley section 125. A spring 157 is connected to ring 143 and the supporting structure for retracting the means for shifting the adjustable pulley section 127 to release belt 101 from driving relation with pulley 100.

The operation of the pulley 100 and belt 101 to control the driving of the countershaft 103 and pulley 102, by power from shaft 90, will be as follows: normally, the valve 154 will cut off suction from manifold 31 and open diaphragm 151 to atmosphere, collar 138 and stud 158 will hold sleeves 141 and 130, bearing 131 and pulley section 127 a sufficient distance away from pulley section 126 to release the belt 101 so it will not be frictionally gripped between said sections and will be ineffective to drive pulley 102 and countershaft 103. When it is desired to operate the refrigerating apparatus by power derived from shaft 90 and transmission 34, the driver of the vehicle in cab 38 will shift pedal 153 and rotate valve 154 to communicatively connect the intake manifold 31 and one side of casing 150 to apply suction to the diaphragm 151 and cause it to exert a pull on flexible rod 155. Said rod will move ring 143 and collar 138 to rotate stud 158 in cam-slot 142 in non-rotatable sleeve 141 and move the sleeve axially, which will axially shift collar 138, bearing 131 and the hub of pulley section 127 toward the mating section 125 so that the belt 101 will be gripped by pulley 100 and drive pulley 102 and countershaft 103. In this manner, the driver of the vehicle can control the operation of the refrigerating apparatus from shaft 90 by power derived from the engine 30. When it is desired to discontinue the operation of the refrigerating apparatus by said power, the operator will shift valve 154 to cut off the suction from manifold 31 to one side of casing 150 and open the other side to atmosphere. Spring 157 will reversely rotate ring 143 and cause stud 139 and stationary cam-slot 142 to axially shift collar 138, sleeve 130, bearing 131 and pulley section 127 away from pulley section 125 to loosen belt 101 to render it ineffective to drive pulley 102. Such reverse rotation of ring 143 will retract flexible rod 155.

The operation of belt 101 to control the operation of the refrigerating apparatus by power from shaft 90 is responsive through thermostat 43 to temperature variations in the compartment 39. Bellows 200 are connected to and controlled through line 156 by said thermostat. A valve 201 includes a casing 203 and has a valve member 202 movable therein and connected to the bellows 200. The member 202 controls the application of sub-atmospheric pressure to the diaphragm 151 and bleeds the casing 203 to atmosphere. When the temperature in the compartment 39 increases to a predetermined point, bellows responsive to thermostat 43 will shift valve member 202 to pass suction to the casing 150 and operate diaphragm 151 to operate the control means for pulley section 127 to render the belt 101 operative to drive pulley 102 from pulley 100. When the temperature in the compartment decreases to a predetermined point, bellows 200 responsive to thermostat 43 through the line 156 will shift valve member 202 to cut off suction to casing 150 and open it to atmosphere at port 204, whereupon spring 157 will retract the adjusting means for pulley section 127 to release the belt 101 and render it inoperative to drive pulley 102 and countershaft 103.

The means for automatically varying the relative speed of shaft 74 which drives the refrigerating apparatus and the shaft 90 which is driven at speeds which vary responsively to variations in the speed of engine 30 for maintaining a substantially constant speed of shaft 74 and the refrigerating apparatus, comprises a variable speed V-belt and pulley drive between countershaft 103 and shaft 74, a centrifugal governor driven by shaft 90 and means operable by the governor for adjusting said drive.

This variable speed drive comprises (Figs. 8 and 10) a belt pulley 106 on the countershaft 103 including a conical section 110 secured on countershaft 103 and a section 109 which is slidable on countershaft 103 and rotated with section 110 by pins 111 which are slidable in section 109; a spring 113 between the hub of pulley section 109 and an adjustable collar 112 on shaft 103 for yieldingly urging section 109 toward section 110; a belt pulley 108 on shaft 74 includes a conical section 114 which is fixed to shaft 74 and a section 115 axially slidable on the hub of section 114, and a V-belt 107 which extends around and between the sections of pulleys 106 and 108. The speed at which the pulley 108 is driven by pulley 106 is varied by axially shifting pulley section 115 to engage the belt 107 and the pulley sections 114 and 115 on different radii while the spring 113 simultaneously permits said belt to engage pulley sections 109 and 110 on different radii. When the pulley section 114 is adjusted to move away from pulley section 115, belt 107 will engage the confronting faces of pulley sections 114 and 115 on a shorter radius, and spring 113 will cause pulley section 109 to move toward section 110 and cause the belt 107 to decrease the radius of the engaging area of said belt with the sections of pulley 106. This will drive pulley 106, belt 107 and pulley 108 so that the shaft 74 will be driven at a lower speed relatively to the countershaft 103. When the pulley section 115 is adjusted away from section 114, the belt 107 will engage the confronting faces of pulley sections on a shorter radius and spring 113 will force pulley section 109 to tighten the belt 107 and cause said belt to engage the confronting faces of pulley 106 on a longer radius. This will increase the speed of shaft 74 relatively to the countershaft 103 and shaft 90.

The centrifugal governor (Figs. 7 and 9) for controlling the axial adjustment of pulley section 115 for speed changes is enclosed in a housing 159 and comprises: a hub 160 keyed to rotate with shaft 90, and a pair of centrifugal weights 161 on arms 163 which are pivoted on hub 160 to swing outwardly by centrifugal force. A sleeve 162, slidable on shaft 90, is provided at its inner end with a head 167 and is axially movable by abutments 164 on arms 163, responsive to centrifugal force applied to weights 161. A rock shaft 165 is pivotally supported in the wall of the annular housing 159 and provided with cam arms 166 (Figs. 7, 9 and 14) which are engaged and movable by the head 167 on sleeve 162 for operating the means for adjusting pulley section 114 for speed variation between countershaft 103 and shaft 74.

The means controlled by the rock shaft 65 for shifting the pulley section 115, responsive to variations in the speed of the governor and shaft 90, comprises: a lever 169 (Figs. 5, 10 and 14) fixed to rock shaft 165; a link 170 connected to lever 169; and an arm 171 to which link 170 is connected. A collar 173, coaxial with shaft 74, is fixed by screws 172 to arm 171. A ball bearing 179 includes an inner race 180 which is fixed on a hub 175 which is secured by a screw to arm 171, which is fixed to collar 173, and an outer race 181 which is secured by a ring 182 and screws 183 to the hub of adjustable section 115 of pulley 108. Collar 173 is rotatable in a sleeve 176 which is supported in the front end of the supporting structure hereinafter described, and held against rotation by radial pins 176' (Fig. 11). A stud 178 on a radial axis is movable with collar 173 and extends into a cam slot 177 in sleeve 176 for axially shifting collar 173, bearing 179 and pulley section 115 when the arm 171 is rotated in sleeve 176. The arm 171, collar 173 and pulley section 115 are retracted responsive to a decrease in the speed of the governor by a spring 188 (Fig. 3) in a cylinder 187 and a piston 186 in said cylinder which is connected to an arm 185 on lever 169 for rocking shaft 165 and causing cam arms 166 to follow head 167 on sleeve 162. A stop screw 199 (Fig. 14) in housing 159 limits the movement of arms 166 and shaft 165 in one direction by spring 188.

The operation of the variable speed mechanism for driving shaft 74 which drives the refrigerating apparatus when said apparatus is driven from shaft 90 which is responsive to variations in the speed of the engine 30, will be as follows: when shaft 90 is driven to operate the refrigerating apparatus as previously described so that the spring 188 will maintain the pulley section 115 away from pulley section 114. The belt 107 will then engage pulley 106 on a long radius and pulley 108 on a short radius, and drive pulley 108 on shaft 74 at higher speed than the countershaft 103. When the speed of the engine 30 is increased there will be a proportionate increase in the speed of shaft 90. The centrifugal weights 161 will slide sleeve 162 and head 167 inwardly proportionately to the increase in the speed of shaft 90. Head 167 will rock arms 166 and shaft 165 and operate lever 169 which will shift link 170 to rock arm 171. Stud 178 moving in helical cam slot 176 in stationary ring 180 will move collar 173, bearing 179 and pulley section 115 axially toward the pulley section 114. The belt 107 will thereby be forced to engage the sections 114, 116 of the pulley on a greater radius. Simultaneously the belt 107 as permitted by spring 113 will engage the pulley 106 on a lesser radius. This change in the position of belt 107 on pulleys 106 and 108 will result in driving the shaft 74 at a lower speed relatively to the shaft 90 and reducing the speed of the refrigerating apparatus to compensate for the incerase of speed of the shaft 90. Upon a substantial decrease in the speed of shaft 90, the centrifugal weights 161 will move radially inward and slide the sleeve 162 rearwardly on shaft 90 proportionately to said decrease in speed. Spring 188 and piston 186 will operate arm 185 to rock shaft 165 and cause arms 166 to follow head 167. Lever 169 will operate link 170 and arm 171 to rotate collar 173. Stud 178 moving in the helical cam slot 177 will shift the pulley section 115 axially away from pulley section 114 so that belt 107 will engage the sections of pulley 108 on a shorter radius and the sections of pulley 106 on a longer radius. The speed of the shaft 74 and the refrigerating apparatus will be increased to compensate for the decrease in the speed of shaft 90. In this manner, the centrifugal governor will control the speed of shaft 74 and the refrigerating apparatus from the shaft 90 which is responsive to fluctuating speeds in the propulsion of the vehicle, to compensate for such fluctuations and drive the refrigerating apparatus at a substantially constant speed.

Shaft 74 rotates with the rotor of electric motor 75 so that the electrical operation of said motor will also drive pulleys 76 and 80 for the operation of the compressor 60, fan 66 and flexible shaft 86. An electric switch mechanism 190 is adapted to control the operation of motor 75 and includes a plug-in connection 191 for supplying current to the motor through a flexible conductor 192 from a source of current in a garage, filling station or warehouse. This provides for the operation of the refrigerating apparatus by motor 75 when the engine 30 on the vehicle is not in use, for example, when the vehicle is kept in a garage or near a filling station. When the switch 190 is closed, the motor 75 will drive shaft 74 which will drive pulleys 76 and 80 for operating the refrigerating apparatus. The electric motor 75 may be thermostatically controlled as well understood in the art. When the motor 75 is electrically operated and the engine 30 is not operating, there will be no suction in the manifold 31 and diaphragm 151 will be ineffective to operate the flexible rod 155. Belt 101 will be idle and the pulleys 108 and 106, countershaft 103 and pulley 102 may run idly with the motor 75. When the shaft 74 is driven by power from shaft 90, the rotor of electric motor 75 will run idly with shaft 74. This avoids necessity of mechanical coupling and uncoupling devices.

The refrigerating mechanism, including compressor 60, condenser 62, fan 63, casing 67, receiver 65, electric motor 75, the belt drive which serves as a clutch, shaft 74 and the gearing operated thereby, the shaft 90, the variable speed drive for shaft 74 and the control means for said drives, are supported on a structure which is demountably supported under the floor 29 and rearwardly of the bulkhead 26 for sidewise and unitary installation and removal when repairs or replacements are necessary. This supporting structure (Fig. 16) comprises: a platform or bed 46 on the top of which the compressor 60, motor 75, casing 150 and fan 66 are mounted and under which the receiver 65 is secured, and a front end frame 47 which has integral side members 48 and is welded or otherwise secured to platform 46. A bracket 49 of angular cross section has a horizontal member 50 on which the rear end of platform 46 is supported, and a vertical member 51 which is removably secured by bolts 52 on the outer side of longitudinal beam 23 of the chassis. A bracket 53 of angular cross section has a horizontal member 54 which is secured to a flange 55 on front frame 47 and a depending member 56 which is demountably secured by bolts 57 to the outer side of beam 23. Upon removal of bolts 52 and 57, the supporting structure including platform 46, front frame 47, brackets 49 and 53 and all the equipment on said structure may be unitarily removed from the chassis. When a repair or replacement of parts of the refrigerating apparatus on the supporting structure under the floor of the vehicle is necessary, the pipe connections for the evaporator unit in the vehicle body will be uncoupled and shaft 90 disconnected from chain and sprocket drive 34'. Removal of bolts 52 and 57 will permit the supporting structure including platform 46 and frame 47 and all of apparatus mounted thereon, including compressor 60, motor 75, receiver 65, fan 66, the belt drive between shaft 90 and countershaft 103, the variable speed drive between countershaft 103 and shaft 74, the suction casing 150, the gearing driven by shaft 74, the centrifugal governor and control means for the drive between shaft 90 and countershaft 103, to be unitarily mounted on the chassis and demounted for expediting installation, repairs or replacements.

Shaft 90 is journalled in a bearing 210 which is mounted in a head 211 on the rear end of governor-housing 159 and a bearing 210a which is mounted in head 211a on the front end of said housing. Screws 215 (Fig. 9) secure the head 211 which fits the back of frame 47 and the front end of housing 159 on said frame. Countershaft 103 is journalled in a bearing 216 which is mounted in a head 217 which is mounted in front plate 47. A strut 218 has a bearing 219 for the countershaft 103 and a bearing 220 for the front end of shaft 90. Front frame 47 has a forwardly extending flange 221 which with a cover 222 and said frame form a housing for enclosing the driving means between shafts 90 and 103 and the strut 218. A pin 225 on cam ring 141 holds said ring against rotation for axially moving the stud 139 on collar 138 for adjusting pulley section 127 of pulley 100. Pins 176' (Fig. 10) in a head 224 secured on front frame 47, secure the cam ring 176 against rotation for axially shifting the pulley section 115 of pulley 108.

In the operation of the refrigerating apparatus, assuming the body of the vehicle has a load of goods which requires refrigeration in transit and while the engine 30 is running, the operator of the vehicle can control operation of the refrigerating apparatus from shaft 90 by shifting pedal 153 to vary the condition of the valve 154 and effect movement of the ring 143 in such a manner that the belt 101 will establish a driving connection to the countershaft 103 as previously described. The refrigerating apparatus will thus be operated to circulate refrigerant through the evaporator for cooling the compartment 39 by power derived from the vehicle engine 30 via the clutch 35 and transmission gearing 34 and shaft 90. The speed of engine 30 while the vehicle is travelling to transport the load in compartment 39, fluctuates with the changes in the speed of travel of the vehicle and the variable speed drive between countershaft 103 and shaft 74 compensates for these fluctuations in the manner previously described to maintain a suitable speed of the mechanism which is driven by shaft 74 for driving the refrigerating apparatus. When the shaft 74 is driven from shaft 90 and the temperature in compartment 39 is lowered to a predetermined range, the thermostat 43 will control bellows 200 through pipe 156 to shift valve member 202 to cut off suction to the casing 150, and spring 157 will retract the means for adjusting pulley section 127 of pulley 100 and release belt 101 to discontinue the operation of countershaft 103, the variable speed drive between shafts 103 and 74 and the refrigerating apparatus. When the temperature in compartment 39 increases to a predetermined point, the valve member 202 will be thermostatically operated to apply suction to casing 150 for adjusting pulley section 127 to coact with pulley section 125 for driving belt 101, the variable speed drive and shaft 74. The refrigerating apparatus may be driven by power derived from the engine 30 which drives the vehicle whenever the engine is operating, either while the vehicle is travelling or stationary. A valve 210 is provided in pipe 152 at the manifold 31 for cutting off the inlet of air to said manifold when the refrigerating apparatus is not in use, for example, when the body of the vehicle has no load which requires refrigeration.

In many instances the engine 30 is not operated, for example, when the vehicle is parked in a garage or at a filling station where electrical current from a stationary source is available. The refrigerating apparatus can then be operated by electric motor 75 until the engine 30 is again operated. When engine 30 is not running, there will be no suction in manifold 31, the speed governor will be idle and spring 157 will hold collar 138 so that pulley section 127 will be out of driving engagement with belt 101 and said belt will be idle. When switch 190 is closed to establish a circuit through the motor 75, the latter will be driven by electric power from the outside source. When the motor 75 is thus operated, the variable speed drive between shaft 74 and the countershaft 103 will idly rotate. When the shaft 74 is driven from shaft 90, the armature of the rotor of motor 75 on shaft 74 will idly rotate.

The invention is not to be understood as restricted to the details set forth since these may be modified within the scope of the appended claims without departing from the spirit and scope of the invention.

Having thus described the invention what I claim as new and desire to secure by Letters Patent is:

1. In a refrigeration system for a motor driven vehicle having a supporting frame on which there are operatively mounted an internal combustion engine provided with an intake manifold, a transmission including a shaft extending longitudinally of the frame, and means defining a refrigeration chamber, said refrigeration system being of the compressor-condenser-evaporator type and including a compressor crank, a condenser fan and an evaporator fan, said evaporator being disposed within the refrigeration chamber, a power shaft for the system, means operatively connecting said power shaft to the compressor crank, the condenser fan and the evaporator fan respectively in driving relationship, a drive shaft for the power shaft, means operatively connecting said drive shaft and longitudinally extending shaft in driving relationship, a counter-shaft operatively interposed between the drive shaft and power shaft, a variable speed power train extending between the countershaft and power shaft and including a movable speed change element, a centrifugal governor responsive to the speed of said drive shaft and operatively connected to the speed change element for maintaining a constant speed of rotation of the power shaft during rotation of the counter-shaft, a power train extending between the counter-shaft and drive shaft and including a normally disengaged clutch operable upon engagement thereof to establish a driving connection between the counter-shaft and drive shaft and operable upon disengagement thereof to disconnect such driving connection, a suction motor operatively connected to said clutch and operable upon application of subatmospheric pressure thereto to cause engagement of the clutch, and a control valve operatively connecting the suction motor and engine manifold.

2. In a refrigeration system for a motor driven vehicle, the combination set forth in claim 1 including, additionally, thermostatically controlled means operable when the temperature in said refrigeration chamber attains a predetermined minimum for rendering said control valve inoperative.

3. In a refrigeration system for a motor driven vehicle, the combination set forth in claim 1 wherein said means connecting the drive shaft and longitudinally extending shaft comprises a chain and sprocket mechanism.

4. In a refrigeration system for a motor driven vehicle, the combination set forth in claim 1 wherein said variable speed power train between the counter-shaft and power shaft includes two expansible and contractible pulleys on the counter-shaft and power shaft respectively, a V-belt entrained in said pulleys, and a spring for exerting a contraction force on one of said pulleys, the other pulley including relatively movable pulley sections, one of which constitutes said movable speed change element.

5. In a refrigeration system for a motor driven vehicle, the combination set forth in claim 4 wherein the spring-contracted pulley is disposed on said counter-shaft and wherein said other pulley is disposed on the power shaft.

6. In a refrigeration system for a motor driven vehicle, the combination set forth in claim 4 wherein said power train between the counter-shaft and drive shaft includes two pulleys on the counter-shaft and drive shaft respectively, one of said pulleys being provided with an axially fixed and an axially slidable pulley section, a V-belt entrained in said two last mentioned pulleys and engageable by said pulley sections when the latter are moved toward each other a predetermined distance, said pulley sections and belt constituting said normally disengaged clutch, said suction motor being operatively connected to the movable pulley section.

7. In a refrigeration system for a motor driven vehicle, the combination set forth in claim 6 wherein the sectional pulley is disposed on said drive shaft and wherein the other of said last two mentioned pulleys is disposed on the counter-shaft.

8. In a refrigeration system for a motor driven vehicle, the combination set forth in claim 1 including, additionally, an electric motor mounted on said frame and having a motor shaft, and means operatively connecting said motor shaft and power shaft in driving relationship.

References Cited in the file of this patent

UNITED STATES PATENTS

| | | |
|---|---|---|
| 2,084,032 | Ives | June 15, 1937 |
| 2,162,512 | McPherson et al. | June 13, 1939 |
| 2,187,569 | Henny | Jan. 16, 1940 |
| 2,362,084 | Miller | Nov. 7, 1944 |
| 2,382,667 | Ryan et al. | Aug. 14, 1945 |
| 2,527,790 | Borgerd | Oct. 31, 1950 |
| 2,677,251 | Clark | May 4, 1954 |